United States Patent
Kanugovi et al.

(10) Patent No.: US 11,665,263 B2
(45) Date of Patent: *May 30, 2023

(54) NETWORK MULTI-PATH PROXY SELECTION TO ROUTE DATA PACKETS

(71) Applicant: NOKIA SOLUTIONS AND NETWORKS OY, Espoo (FI)

(72) Inventors: Satish Kanugovi, Bangalore (IN); Pramod Adharapurapu, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 70 days.

This patent is subject to a terminal disclaimer.

(21) Appl. No.: 17/388,775

(22) Filed: Jul. 29, 2021

(65) Prior Publication Data

US 2022/0021754 A1 Jan. 20, 2022

Related U.S. Application Data

(63) Continuation of application No. 16/484,372, filed as application No. PCT/EP2018/051040 on Jan. 17, 2018, now Pat. No. 11,089,138.

(30) Foreign Application Priority Data

Feb. 15, 2017 (IN) .............................. 201741005427

(51) Int. Cl.
  *H04W 40/02* (2009.01)
  *H04L 69/14* (2022.01)
  (Continued)

(52) U.S. Cl.
  CPC .............. *H04L 69/14* (2013.01); *H04L 45/24* (2013.01); *H04L 45/38* (2013.01); *H04L 67/56* (2022.05);
  (Continued)

(58) Field of Classification Search
  CPC ......... H04L 67/56; H04L 69/14; H04L 45/38; H04W 48/18; H04W 40/02; H04W 48/08; Y02D 30/50
  See application file for complete search history.

(56) References Cited

U.S. PATENT DOCUMENTS 9,929,942 B2  3/2018 Horn et al.
10,356,013 B2  7/2019 Boucadair et al.
(Continued)

FOREIGN PATENT DOCUMENTS

WO  WO 2005/039197 A2  4/2005
WO  WO 2016/177106 A1  11/2016
WO  WO 2016/197004 A2  12/2016

OTHER PUBLICATIONS

International Search Report and Written Opinion dated Dec. 4, 2018 in corresponding Application No. PCT/EP2018/051040, 8 pages.

*Primary Examiner* — Brian D Nguyen
(74) *Attorney, Agent, or Firm* — Tong, Rea, Bentley & Kim, LLC

(57) ABSTRACT

Aspects related to selection of a network link to route data packets is described. In an example, a method for enabling selection of the network link to route the data packets includes receiving communication capabilities from a Client Connection Engine (CCE), where the CCE manages uplink and downlink data packet routing of a client device. The method further includes instantiating at least one network multi-path proxy, based on the communication capabilities, where each of the at least one network multi-path proxy is configured to aggregate and route data packets to a specific network link. In addition, the method includes sharing identification information pertaining to the at least one network multi-path proxy and corresponding network links for selection of the at least one network multi-path proxy.

26 Claims, 5 Drawing Sheets

(51) Int. Cl.
  *H04L 45/24*  (2022.01)
  *H04L 45/00*  (2022.01)
  *H04W 48/08*  (2009.01)
  *H04W 48/18*  (2009.01)
  *H04L 67/56*  (2022.01)

(52) U.S. Cl.
  CPC ........... *H04W 40/02* (2013.01); *H04W 48/08* (2013.01); *H04W 48/18* (2013.01)

(56) References Cited

U.S. PATENT DOCUMENTS

| | | | |
|---|---|---|---|
| 10,476,992 B1* | 11/2019 | Amdahl | H04L 67/141 |
| 2011/0222404 A1 | 9/2011 | Watson et al. | |
| 2016/0119196 A1 | 4/2016 | Comeras et al. | |
| 2017/0085484 A1 | 3/2017 | Hellander et al. | |
| 2017/0118169 A1 | 4/2017 | Boucadair et al. | |
| 2017/0277646 A1* | 9/2017 | Stankey | G06F 9/4406 |
| 2018/0062979 A1 | 3/2018 | Zee et al. | |
| 2018/0109473 A1 | 4/2018 | Boucadair et al. | |
| 2018/0248714 A1* | 8/2018 | Milescu | H04L 45/38 |
| 2019/0297534 A1* | 9/2019 | Hwang | H04L 47/36 |
| 2019/0363974 A1* | 11/2019 | Wang | H04L 61/00 |
| 2020/0092400 A1* | 3/2020 | Bonaventure | H04L 47/193 |
| 2022/0224738 A1* | 7/2022 | Petria | H04L 67/56 |

\* cited by examiner

NETWORK MULTI-PATH PROXY SELECTION TO ROUTE DATA PACKETS

CROSS-REFERENCE TO RELATED APPLICATIONS

The application is a continuation of U.S. patent application Ser. No. 16/484,372, filed on Aug. 7, 2019, now U.S. Pat. No. 11,089,138, which is based on and claims the benefit of International Patent Application No. PCT/EP2018/051040, filed on Jan. 17, 2018, which claims priority to Indian Patent Application No. 201741005427, filed on Feb. 15, 2017, each of which is hereby incorporated herein by reference in its entirety.

FIELD OF INVENTION

The present subject matter relates to multi-connectivity client devices (MCCD) and, particularly, but not exclusively, to selecting a network multi-path proxy to route data packets from and to such MCCD.

BACKGROUND

A communication network, generally provides communication services, such as transmission of data packets, between network terminals, such as a client device and a server. The network terminals communicate with each other using different protocols, supported by the communication network. Transmission control protocol (TCP) is one such protocol which is employed to establish a connection between the network terminals and exchange data packets between. For example, the client device may communicate with the communication network using TCP links for accessing an application server. In an example, the client device may simultaneously communicate with multiple communication networks to access the application server.

SUMMARY

This summary is provided to introduce concepts related to selecting a network multi-path proxy to route data packets from a multi-connectivity client device (MCCD), in a communication network. This summary is not intended to identify essential features of the claimed subject matter nor is it intended for use in determining or limiting the scope of the claimed subject matter.

In an aspect of the present subject matter, a method for enabling selection of a network multi-path proxy to route data packets is described. The method includes receiving communication capabilities from a Client Connection Engine (CCE), where the CCE manages uplink and downlink data packet routing of a client device. The method further includes instantiating or assigning at least one network multi-path proxy, based on the communication capabilities, where each of the at least one network multi-path proxy is configured to aggregate and route data packets to a specific network link. In addition, the method includes sharing identification information pertaining to the at least one network multi-path proxy and corresponding network links for selection of the at least one network multi-path proxy.

In another aspect of the present subject matter, a multi-connectivity client device (MCCD) is described. The MCCD includes a processor and a client connection engine (CCE) coupled to the processor. The CCE is to transmit communication capabilities to a network connection engine (NCE) to provide at least one network multi-path proxy. Each of the at least one network multi-path proxy is configured to aggregate and route data packets to a specific network link. The CCE is to also receive identification information pertaining to the at least one network multi-path proxy and corresponding network links from the NCE. Based on the identification information, the CCE selects a network multi-path proxy to route the data packets.

In yet another aspect of the present subject matter, a non-transitory computer-readable medium is described. The non-transitory computer-readable medium comprising computer-readable instructions, which, when executed by a processor, cause the processor to receive communication capabilities from a client connection engine. The client connection engine manages uplink and downlink data packet routing of the client device. Further, the instructions cause the processor to instantiate or assign at least one network multi-path proxy, based on the communication capabilities. Each of the at least one network multi-path proxy is configured to aggregate and route data packets to a specific network link. The instructions also cause the processor to share identification information pertaining to the at least one network multi-path proxy and corresponding network links with the CCE. Further, the processor is caused to receive a routing request from the CCE to route the data packets through a selected network multi-path proxy, based on the identification information.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some implementations of system and/or methods in accordance with implementations of the present subject matter are now described, by way of example only, and with reference to the accompanying figures, in which.

DESCRIPTION OF IMPLEMENTATIONS

Figure 1:
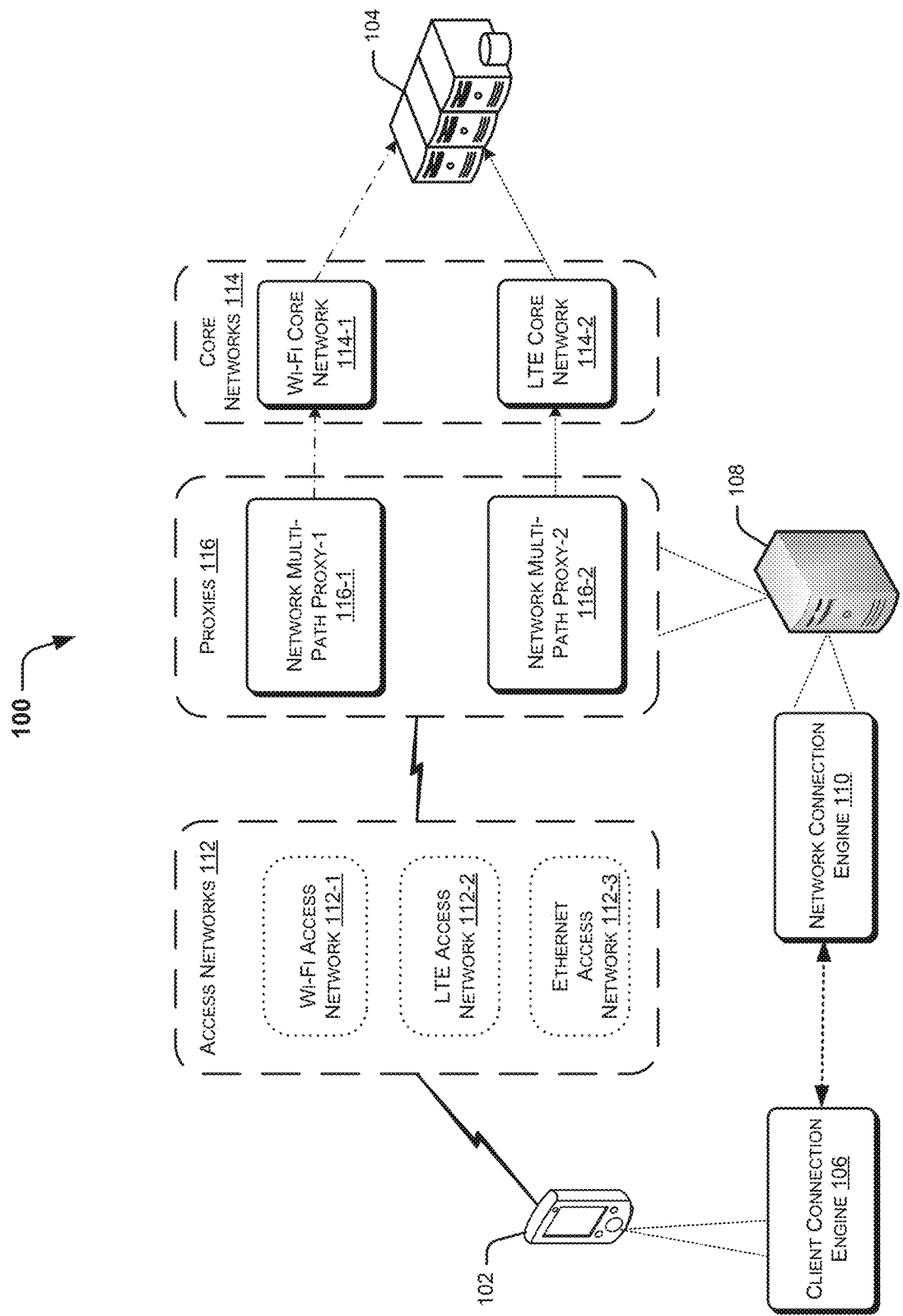
FIG. 1 illustrates a communication environment, according to an implementation of the present subject matter.

In order to utilize various communication services, such as transmission of data packets, network terminals may connect to a communication network. For example, the client device may communicate with the communication network using TCP links for accessing an application server. The communication network may include an access network and a core network associated with the access network to provide the communication services to the network terminals. However, in order to allow fast uplink and downlink of data packets and high availability of network links, network terminals, such as multi-connectivity client devices (MCCD) may connect simultaneously to multiple communication networks, by utilizing a multi-path proxy. For example, the multi-path proxy may support multiple Transport Control Protocol (TCP) sub-flows towards the MCCD and a TCP link towards an application server.

The multi-path proxy enables the MCCD to leverage flow aggregation from multiple communication networks without having the application server to be capable of connecting simultaneously to the multiple communication networks. However, the multi-path proxy routes the data packets from one of the MCCD, such as the client device, to the application server using a pre-assigned core network that may be statically configured. In cases where the pre-assigned core network is congested at the time of transmission, the data packets may get lost. Since the multi-path proxy does not provide flexibility to the MCCD to switch to another core network dynamically based on current network conditions, the multi-path proxy may not be able to provide seamless multi-network communication in the event conditions over the core network being used are not favorable.

In TCP/IP based routing, the network terminals, such as the client device may manage a routing table and routing rules based on which the data packet is forwarded to a next destination. The routing table may include information, such as a destination Internet Protocol (IP) address, destination port number and the like. Therefore, to select another core network, routing tables and routing rules managed by the network terminals may have to be updated to include information pertaining to such other core network. However, when the data packets may be routed via more than one core network, management of the routing tables may become complex. In such cases, the routing tables have to be updated based on a current network state, in real-time. In addition, the routing rules may have to be configured and updated in the network terminals to indicate a preferred core network to access the application server. Therefore, managing routing details may become cumbersome.

Approaches for selection of a network link for routing data packets, from a multi-connectivity client device (MCCD) are described. In an example implementation, the MCCD may transmit its communication capabilities to a network server to provide at least one network multi-path of proxy. The at least one network multi-path proxy is configured to aggregate and route data packets to a specific network link. The network server may share identification information pertaining to the at least one network multi-path proxy and corresponding network links to enable the MCCD to select a multi-path proxy for routing the data packets. Thus, the present subject matter provides for dynamic selection of a core network, based on a current network state, to route the data packets from the MCCD to an application server.

In operation, the MCCD may transmit its communication capabilities to the network server. In an example, the communication capabilities may be transmitted as a message to the network server. Based on the communication capabilities, the network server may instantiate one or more network multi-path proxies or assign existing network multi-path proxy to aggregate and route data packets from the MCCD to a specific network link. For example, the network server may create the network multi-path proxy, if not already created for the MCCD. If the network multi-path proxy is already created, the network server may assign the multi-path proxy to a specific network link.

In an example, the at least one network multi-path proxy is a Multipath Transmission Control Protocol (MPTCP) proxy. Further, the specific network link may be configured to direct the data packets towards a specific core network, such as Wi-Fi core network or an LTE core network, to access the application server.

Once the network multi-path proxy is created and/or identified, the network server may share identification information pertaining to the network multi-path proxy with the MCCD. In an example, the identification information may include a port number and an Internet Protocol (IP) address. In an implementation, the network server may provide identification information pertaining to a preferred network multi-path proxy, based on current network conditions. For example, network conditions may indicate status of data traffic on a specific network link. Based on the availability of a specific network link, the network server may provide identification information pertaining to the specific network link to the MCCD.

Upon receiving the identification information, the MCCD may utilize any combinations of the available network multi-path proxies, based on different types of applications. As the MCCD selects the multi-path proxy based on the identification information, the MCCD is aware of a core network that may be utilized for accessing the application server. Accordingly, the MCCD may update the routing tables and the routing rules based on the identification information received from the network server. Thereafter, the MCCD may establish a multi-path protocol session, such as an MPTCP session, with a selected network link corresponding to the selected multi-path proxy.

As would be understood, the above described techniques may allow the MCCD to share communication capabilities with the network server, based on which the network server may enable selection of a network multi-path proxy for routing data packets from the MCCD, by creating or assigning network multi-path proxies corresponding to different network links. Further, the implementation of the above described techniques may provide flexibility to the MCCD to dynamically switch between core networks based on network conditions, to facilitate effective and seamless multi-network communication.

The manner in which the aspects for selecting a network link for routing data packets from the MCCD shall be implemented has been explained in detail with respect to FIGS. 1-5. While aspects of the present subject matter may be implemented in any number of different computing systems, transmission environments, and/or configurations, the implementations are described in the context of the following system(s) as examples.

FIG. 1 illustrates a communication environment 100 for selecting a network multi-path proxy to route data packets from a multi-connectivity client device (MCCD) 102, according to an implementation of the present subject matter. In an example, the MCCD 102 may be a user equipment (UE) carrying out communications through multiple communication networks within the communication environment 100. The MCCD 102 may include any UE, such desktop computers, hand-held computing devices, portable computers, network computers, or wireless handheld devices, such as mobile phones, personal digital assistant (PDA), smart phones, multi-media enabled phones, and residential gateways which are capable of simultaneously communicating with multiple communication networks.

The MCCD 102 may communicate with a target terminal 104. In an example, the target terminal 104 may be a server, hosting an application, with which the MCCD 102 may establish communication to access and exchange data. In an example, the target terminal 104 may be implemented as a central directory server, a database server, a web server, or an application server.

Each of the communication networks may be a wireless or a wired network, or a combination thereof. The communication network may be a collection of individual networks, interconnected with each other and functioning as a single large network, for example, the internet or an intranet. Few or all of the communication networks may be implemented as one of the different types of networks, such as local area network (LAN), wide area network (WAN), Wireless Local Area Network (WLAN), and such. The communication network may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

In one example, the MCCD 102 may use General Packet Radio Service (GPRS) along with other communication networks for communicating with the target terminal 104. In addition, few or all of the communication networks may be implemented as individual networks including, but are not limited to, 3GPP Long Term Evolution (LTE), Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). In other words, the communication networks may include cellular telecommunication networks, wired networks, or wireless networks other than cellular telecommunication networks, or a mix thereof.

In an example implementation of the present subject matter, the MCCD 102 may include a Client Connection Engine (CCE) 106. The CCE 106 may manage uplink and downlink data packet routings of the MCCD 102. In other words, the CCE 106 may manage multiple connections of the MCCD 102 with different communication networks, and may enable exchange of data through such different communication networks. The CCE 106 may be implemented as software or hardware logic within the MCCD 102.

The MCCD 102 may communicate with a network server 108 to access the target terminal 104. In an example, the network server 108 may be implemented as a Mobile Edge Computing (MEC) server. The network server 108 is depicted as the MEC server, it would be appreciated that the network server 108 may be implemented as any other network entity. In an example, the network server 108 may be located at a user plane path at an edge of access networks. The network server 108 may perform, control, or coordinate a service or resource in a communication network.

In an example, credentials pertaining to the network server 108 may be provided to the MCCD 102 for establishing a connection with the network server 108. In an example, a network address of the network server 108 may be pre-provisioned in the CCE 106. Based on the credentials, the CCE 106 may communicate with the network server 108.

In an example implementation, the MCCD 102 may communicate with the target terminal 104 through a combination of different access networks 112 and core networks 114. The access networks 112 of the present subject matter may form a sub-part of the communication networks. In an example implementation of the present subject matter, the access networks 112 may be a cluster of multiple access networks, such as a Wi-Fi access network 112-1, an LTE access network 112-2, and an Ethernet access network 112-3. The core networks 114 may be a cluster of multiple core networks, such as a Wi-Fi core network 114-1 and an LTE core network 114-2. A core network 114 may be understood as a central part of the communication network that provides various services to client devices, such as the MCCD 102, who are connected by the access networks 112. In addition, the core network 114 may provide a gateway to other networks.

The access networks 112 and the core networks 114 may be implemented through different network entities, such as including routers, bridges, gateways, computing devices, and storage devices, depending on the technology; however, such details have been omitted for the sake of brevity.

In an example, the network server 108 may include a Network Connection Engine (NCE) 110. In an example, each communication network of the communication environment 100 may implement one or more NCEs to communicate with CCEs of different MCCDs. In an example, the communication environment 100 depicts communication between the CCE 106 and the network server 108, it will be appreciated that the CCE 106 may communicate with multiple network servers and the network server 108 may communicate with multiple MCCDs.

In an example, the CCE 106 may communicate with the NCE 110 over a communication network (not shown in FIG. 1) to transmit communication capabilities of the MCCD 102. Examples of the communication capabilities may include interface capabilities and choice of multi-path protocol that may be utilized for routing the data packets from the MCCD 102. In addition, the communication capabilities may include choice of a core network through which the target terminal 104 is to be accessed.

Based on the communication capabilities of the MCCD 102, the NCE 110 may instantiate multiple Network Multi-Path Proxies (NMPPs) 116. The NMPPs 116 may handle uplink and downlink data packet routing of the MCCD 102, to enable the MCCD 102 to simultaneously communicate with multiple communication networks. The NMPPs 116 may be implemented by a network entity within the communication environment 100. In an example, the NMPPs 116 may provide multi-path connectivity to the network terminals, such as the MCCD 102.

The NMPPs 116 may be a cluster of multiple network multi-path proxies, such as network multi-path proxy 116-1 and network multi-path proxy 116-2. In the present implementation, the MCCD 102 may be served by the NMPPs 116-1 and 116-2 to address various user plane demands of multiple applications running on the MCCD 102. The NCE 110 may be implemented in the communication networks, such as in the access networks 112 or in the core networks 114. Further, the NMPPs 116 may also be implemented may be implemented in the communication networks, such as in the access networks 112 or in the core networks 114.

As described earlier, the NMPPs 116 may handle uplink and downlink data packet routing of the MCCD 102 to allow MCCD 102 to communicate with multiple communication networks. In an example implementation, the CCE 106 may communicate with the NCE 110 to transmit communication capabilities of the MCCD 102. Upon receiving the communication capabilities, the NCE 110 may instantiate multiple NMPPs 116. The NMPPs 116 may be configured to aggregate and route data packets to a specific network link.

Further, the NCE 110 may share identification information pertaining to the NMPPs 116 and the corresponding network links, with the CCE 106. Based on the identification information, the CCE 106 may select one or more NMPPs 116 for routing the data packets. The manner in which various components of the MCCD 102 and NCE 110 communicate with each other to enable selection of the network link for routing the data packets, have been further described in reference to FIG. 2 and FIG. 3.

Figure 2:
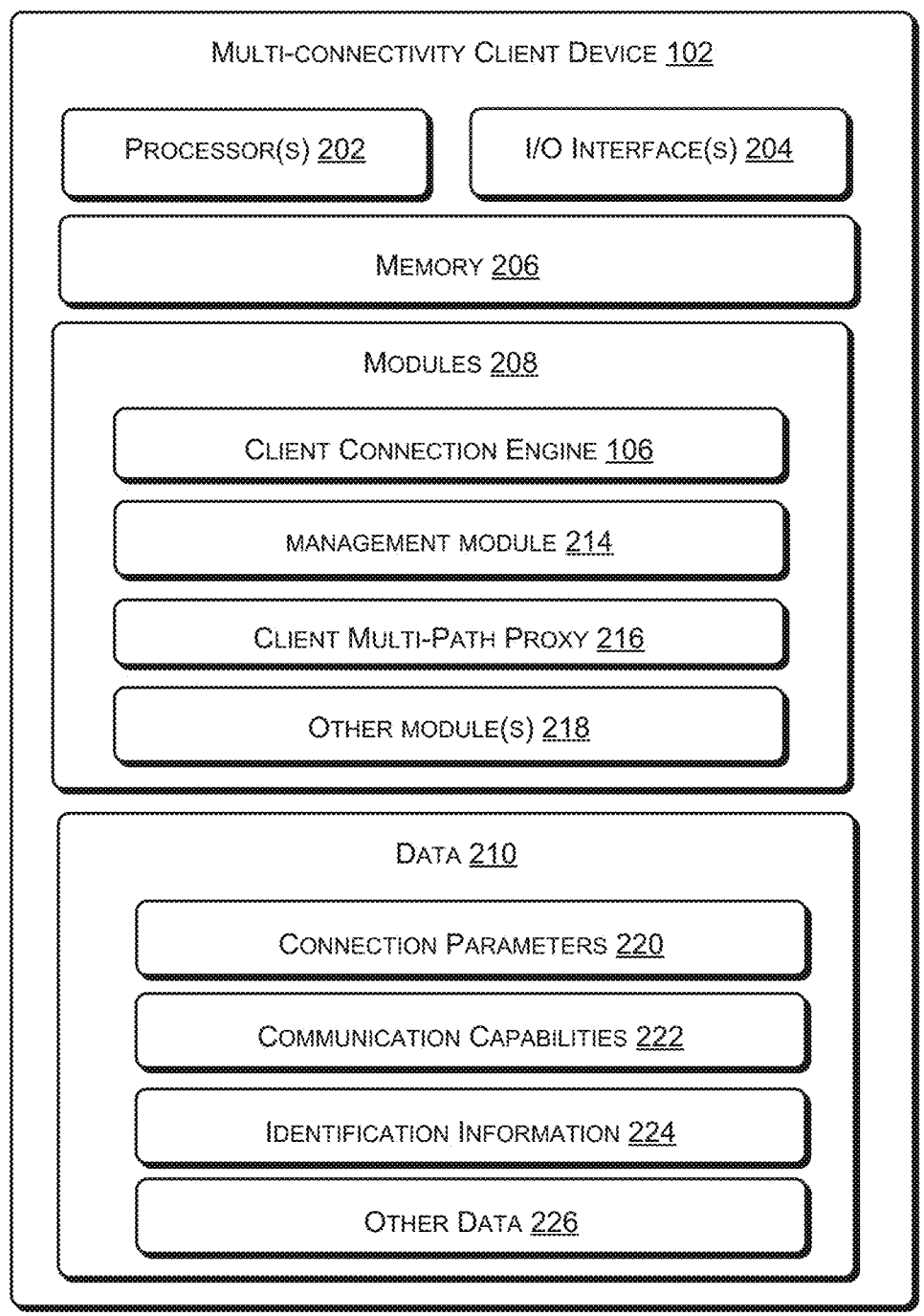
FIG. 2 schematically illustrates a multi-connectivity client device, according to an implementation of the present subject matter.
Figure 3:
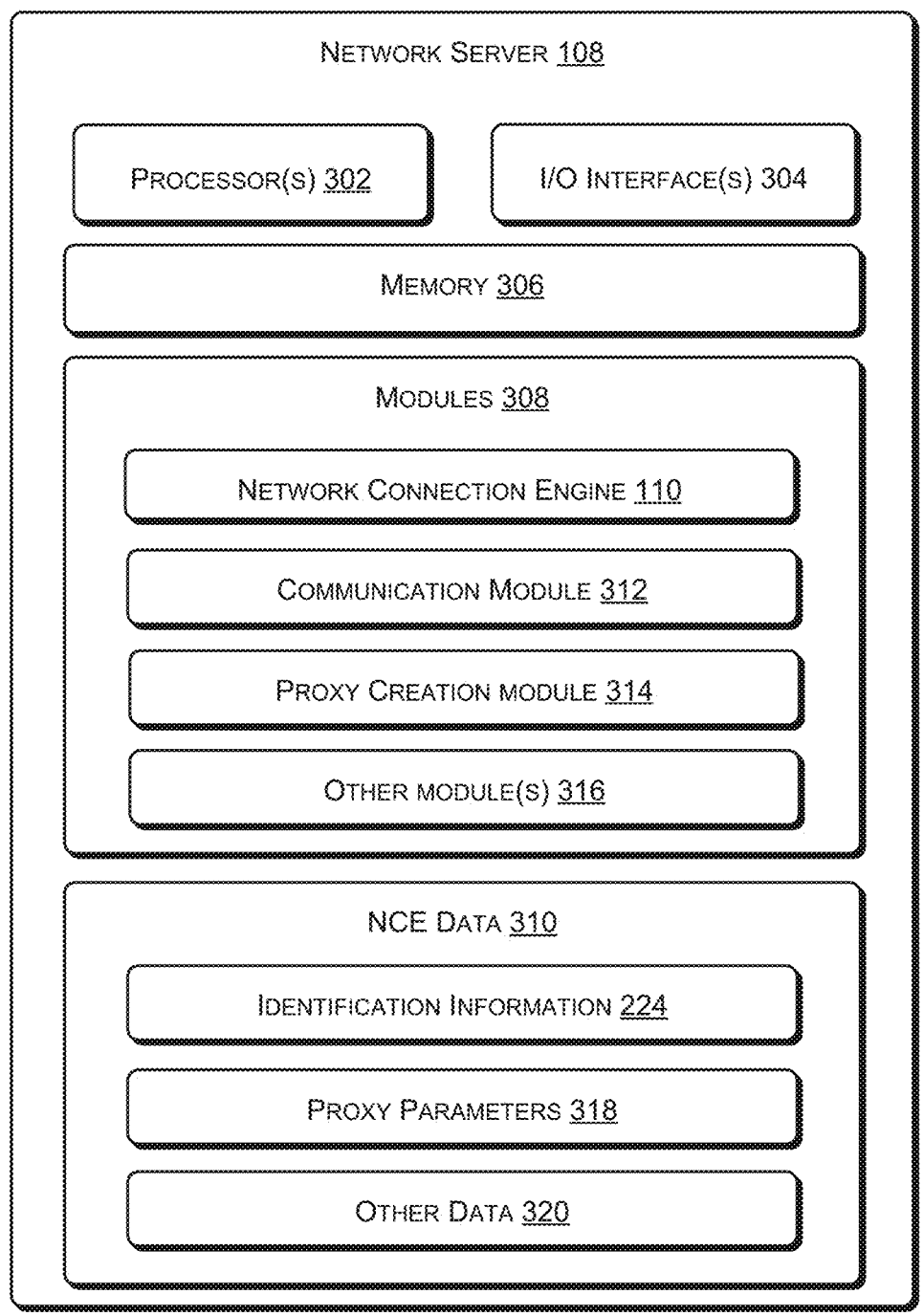
FIG. 3 schematically illustrates a network server, according to an implementation of the present subject matter.

FIGS. 2 and 3 schematically illustrate the MCCD 102 and the network server 108, in accordance with various implementations of the present subject matter. The MCCD 102 may include one or more processor(s) 202, I/O interface(s) 204, and a memory 206 coupled to the processor(s) 202. In another implementation, the network server 108 may include one or more processor(s) 302, interfaces 304, and a memory 306 coupled to the processor(s) 302.

The processor(s) used in the MCCD 102 and the network server 108, can be a single processing unit or a number of units, all of which could include multiple computing units. The processor(s) may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions and data stored in the memory of the MCCD 102 and the network server 108.

The I/O interface(s) used in the MCCD 102 and the network server 108, may include a variety of software and hardware interfaces, for example, interfaces for peripheral device(s), such as a keyboard, a mouse, a display unit, an external memory, and a printer. Further, the I/O interface(s) may enable MCCD 102 and the network server 108 to communicate with other devices, and other external databases (not shown). The I/O interface(s) can facilitate multiple communications within a wide variety of networks and protocol types, including wired networks, for example, local area network (LAN), cable, etc., and wireless networks, such as Wireless LAN (WLAN), cellular network, or satellite. For this purpose, the I/O interface(s) include one or more ports for connecting a number of computing systems with one another or to a network. In an example, the I/O interface(s) 204 may also allow the MCCD 102 to simultaneously connect to multiple communication networks. In another example, the I/O interface(s) 304 may also allow the network server 108 to connect to the NMPPs 116.

Memory (such as the memory 206 and the memory 306) may be any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, MCCD 102 also includes module(s) 208 and data 210. In an implementation, the network server 108 may include module(s) 308 and data 310.

The module(s) 208 and 308, amongst other things, may include routines, programs, objects, components, data structures, etc., which perform particular tasks or implement data types. The module(s) 208 and 308 may also be implemented as, signal processor(s), state machine(s), logic circuitries, and/or any other devices or components that manipulate signals based on operational instructions. Further, the module(s) 208 and 308 can be implemented in hardware, instructions executed by a processing unit, or by a combination thereof. The processing unit can comprise a computer, a processor, such as the processor(s) 202 and 302, a state machine, a logic array, or any other suitable devices capable of processing instructions.

In another aspect of the present subject matter, the module(s) 208 and 308 may be machine-readable instructions, firmware or software, which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via the communication networks. In an example, the module(s) 208, amongst other things, may include the Client Connection Engine (CCE) 106, a management module 214, a Client Multi-Path Proxy (CMPP) 216, and other module(s) 218. In an example, the module(s) 308, amongst other things, may include a communication module 312, a proxy creation module 314, and other module(s) 316.

Further, the data 210 and 310 serves, amongst other things, as a repository for storing data processed, received, and generated by the CCE 106 and the network server 108 respectively. The data 210 includes connection parameters 220, communication capabilities 222, identification information 224, and other data 226. Further, the data 310 includes proxy parameters 318, the identification information 224, and other data 320. The other data 226 and 320 includes data generated as a result of the execution of MCCD 102 and the network server 108 respectively.

For the ease of explanation, the communication between the MCCD 102 and the network server 108 has been explained with the help of components of the MCCD 102 and network server 108 described in FIG. 2 and FIG. 3, along with the different entities described in FIG. 1. In operation, the CCE MCCD 102 may establish a connection with the network server 108 through a communication network. In an example implementation, the CCE 106 may establish the connection with the NCE 110 based on the connection parameters 220. The connection parameters 220 may include information pertaining to the network server 108.

For example, the connection parameters 220 may include parameters, such as link quality between the MCCD 102 and the network server 108 and distance of the network server 108 from the MCCD 102. In an example, the communication networks may include multiple network servers. To establish connection with one NCE, the CCE 106 may determine link quality between the MCCD 102 and each of the multiple network terminals along with the distance between the MCCD 102 and each of the multiple network terminals. The CCE 106 may determine any one NCE to establish the connection, based on the determining.

In an example, the connection parameters 220 may include pre-provisioned network address of the network server 108 based on which the CCE 106 may communicate with the NCE 110. For instance, the communication networks may include different network servers. The network address of $2^{nd}$ network server from amongst the multiple network servers may be pre-provisioned and included in the connection parameters 220. Accordingly, the CCE 106 may directly establish a connection with the NCE 110 of the network server 108 whose network address is pre-provisioned in the communication parameters 220.

It would be appreciated that the CCE 106 and the NCE 110 may exchange multiple messages and may perform a handshake, and exchange data, such as Internet Protocol (IP)

address of each other, to establish a secure connection between each other. In an example, the communication module 312 of the network server 108 and the management module 214 of the MCCD 102 may establish the secure connection between each other by exchanging messages in a predefined communication protocol, such as Extensible Markup Language (XML). In an example implementation, the CCE 106 may exchange XML messages with the NCE 108 through user plane data.

Upon establishing the connection between the CCE 106 and the NCE 110, the CCE 106 may transmit the communication capabilities 222 of the MCCD 102. In an example, the communication capabilities 222 of the MCCD 102 may include interface capabilities and choice of multi-path protocols that may be utilized for routing the data packets from the MCCD 102. For example, MCCD 102 may choose to route the data packets over a multi-path transport control protocol (MPTCP), with the target terminal 104.

In addition, the communication capabilities 222 may include choice of a core network through which the target terminal 104 is to be accessed. For example, the MCCD 102 may choose to access the target terminal 104 by using the LTE core network 114-2. The CCE 106 may also communicate different available configuration modes indicating a combination of available access networks 112 and available core networks 114.

In an example, the CCE 106 may communicate choices of flow aggregation and routing protocols along with the communication capabilities 222, based on which the MCCD 102 may communicate with the core networks 112. For example, the MCCD 102 may support different flow aggregation and routing protocols, including Transmission Control Protocol (TCP), Generic Routing Encapsulation (GRE) tunneling protocol, User Datagram Protocol (UDP), and the MPTCP for flow aggregation and routing. In an example, the CCE 106 may either communicate with all different flow aggregation and routing protocols as the choice of communication, or may select one preferred flow aggregation and routing protocol, and share the same with the communication module 312.

In an example implementation of the present subject matter, the NCE 110 may, based on the communication capabilities 222, instantiate the NMPPs 116 to enable the CCE 106 to select a network link to route the data packets. In an example, based on the communication capabilities 222 of the MCCD 102, the proxy creation module 314 of the NCE 110 may create multiple instances of the NMPPs 116 to facilitate flow aggregation and routing data packets to a specific network link. In an example, each instance of the NMPP 116 may be configured to direct the data packets to a specific core network 112 for accessing the target terminal 104.

In an implementation, the proxy creation module 314 may create the NMPPs 116 based on the communication capabilities 222 of the MCCD 102. In an example, before creating the NMPPs 116, the proxy creation module 314 may determine whether the NMPPs 116 are already existing for the MCCD 102 or not. If not, the proxy creation module 314 may create the NMPPs 116 based on the communication capabilities 222 of the MCCD 102. On the other hand, if the NMPPs 116 are already created, the proxy creation module 314 may configure the existing NMPPs 116 based on the communication capabilities 222 of the MCCD 102.

In an example implementation, the NCE 110 may be configured to cater to the Wi-Fi core network 112-1 and the LTE core network 112-2. Therefore, the proxy creation module 314 may create two instances of the NMPPs 116, such as the NMPP 116-1 and the NMPP 116-2 corresponding to the Wi-Fi core network 112-1 and the LTE core network 112-2 respectively.

Similar to the communication of the communication capabilities 222 of MCCD 102, by the CCE 106, the communication module 312 may also communicate the communication capabilities 222 of the NMPPs 116 with the CCE 106. In the above example, the NMPPs 116 may merely support the MPTCP for the flow aggregation and routing of the data packets. Accordingly, the communication module 312 may share the choice of the MPTCP as the flow aggregation and routing protocol with the CCE 106.

Based on the shared communication capabilities 222, the CCE 106 and the NCE 110 may negotiate communication standards, such as a flow aggregation and routing protocol negotiated between the CCE 106 and the NCE 110. The negotiated flow aggregation and routing protocol may be utilized by the NMPPs 116 and the CCE 106, for managing flow aggregation and routing of data packets for the MCCD 102, while the MCCD 102 communicates with multiple communication networks.

As described in the above example, the MCCD 102 may support multiple different flow aggregation and routing protocols, including the GRE tunneling protocol and the MPTCP. However, the NMPPs 116 may merely support the MPTCP. Therefore, in such scenario, the management module 214 and the communication module 312 may negotiate the MPTCP as a part of the communication standards.

Apart from the flow aggregation and routing protocols, the communication standards may also include a configuration mode. The configuration mode may define a combination of access networks 112 and core networks 114 to be utilized by the MCCD 102, for communicating with the target terminal 104. For example, the configuration mode may define a combination of LTE access network 112-2 and LTE core network 114-2 for uplink establishment, but may define the LTE access network 112-2 along with the Wi-Fi core network 114-1 and LTE core network 114-2 for downlink establishment.

The communication module 312 of the network server 108 may communicate the communication standards negotiated with the CCE 106, to the NMPPs 116. Accordingly, the NMPPs 116 may be made aware of the flow aggregation and routing protocol to be utilized for the flow aggregation and routing of data packets for the MCCD 102, along with the configuration mode to be utilized for the establishment of the uplink and downlink channels for the MCCD 102.

In an example, the CCE 106 may establish a connection with the NMPPs 116 based on the identification information 224. In an implementation, the communication module 312 of the network server 108 may also communicate identification information 224 pertaining to the NMPPs 116 and corresponding network links, with the CCE 106. The identification information 224 pertaining to the NMPPs 116 may include, but is not limited to, network addresses of the NMPPs 116, port numbers of the NMPPs, flow aggregation and routing protocol setup details associated with the NMPPs 116, and distribution policy associated with the NMPPs 116. The identification information 224 may enable the CCE 106 to directly establish a connection with NMPPs 116.

Along with the communication of the identification information 224, the communication module 312 may also share proxy parameters 318 associated with the NMPPs with the management module 214 of the MCCD 102. In an example, the proxy parameters 318 may include, but are not limited to, access and core network path mapping to protocol specific header fields, transport protocols supported like Transmission Control Protocol (TCP) and/or User Datagram Protocol (UDP), security protocols used, and associated keys.

In an implementation, the NCE 110 may provide the identification information 224 pertaining to a preferred NMMP, to the CCE 106. For example, the NCE 110 may, based on current network conditions, provide the identification information 224 associated with the preferred NMMP, to the CCE 106. In an example, the network conditions may suggest a state of data traffic at a particular core network 114 In case the Wi-Fi core network 114-1 is congested, the NCE 110 may share the identification information 224 pertaining to the NMMP 116-2 which is associated with the LTE core network 114. Accordingly, the NCE 110 monitors the network conditions and provides flexibility to the CCE 106 to dynamically change the core network 114 for accessing the target terminal 104.

Based on the identification information 224 and the proxy parameters 318, the CCE 106 may configure the CMPP 216. In an example, the configuring the CMPP 216 may involve assigning specific NMPPs 116 to be used by the MCCD 102 based on a type of application. For example, the CCE 106 may configure the CMPP 216 to utilize NMPP 116-1 for accessing an instant messaging through Wi-Fi core network 114-1. Likewise, the CMPP 216 may be configured by the CCE 106 to access a video streaming application using the NMPP 116-2 which corresponds to the LTE core network 114-2.

In addition to the above, the CCE 106 may configure data delivery paths, access links, and user plane protocols to be used by the CMPP 216 for uplink establishment. In an example, the CCE 106 may configure the CMPP 216 based on the signaling exchanged with the NCE 110 and local policies at the MCCD 102. Once the CCE 106 selects the NMPP 116 and configures the CMPP 216, the CMPP 216 may initiate a multi-path session with the selected NMPP 116.

In an example, as the CCE 106 is aware of the core network 114 that is to be used for accessing the target terminal 104, the routing tables and routing rules associated with the MCCD 102 may be managed. Further, the CCE 106 may be aware of the current network conditions of the core networks 114 and may make a selection accordingly. In an example, the CCE 106 may select multiple NMPPs 116 for routing the data packets. For example, the CCE 106 may configure the CMPP 216 to route the data packets pertaining to one application through the NMPP 116-1 and route the data packets pertaining to another application through the NMPP 116-2. Therefore, the routing tables and routing rules may be updated based on the demands of different applications. Based on the selection, the CCE 106 may send a request to the NCE 110 to route the data packets through the selected NMPP 116.

In an example, the CMPP 216 may be hosted on the same network entities where NMPP 116 is present, in order to provide daisy chaining capability across multiple networks. A daisy chain may include a plurality of network entities, interconnected in series, one after another. The daisy chain is scalable as a user may add more entities anywhere along the chain. In an example, the different CMPPs and NMPPs in the daisy chain may be controlled by different or same CCEs and NCEs.

Accordingly, the above described techniques may be utilized by the MCCD 102 to share the communication capabilities with the network server 108. The communication capabilities 222 of the MCCD 102 may be utilized by the network server 108 for instantiating NMPPs 116 to establish uplink and downlink channels for the MCCD 102. The network server 108, based on a current network condition, provides identification information pertaining to a preferred NMPP 116 to the CCE 106. The CCE 106 may, based on the identification information select one or more NMPPs 116 for routing the data packets.

Figure 4:
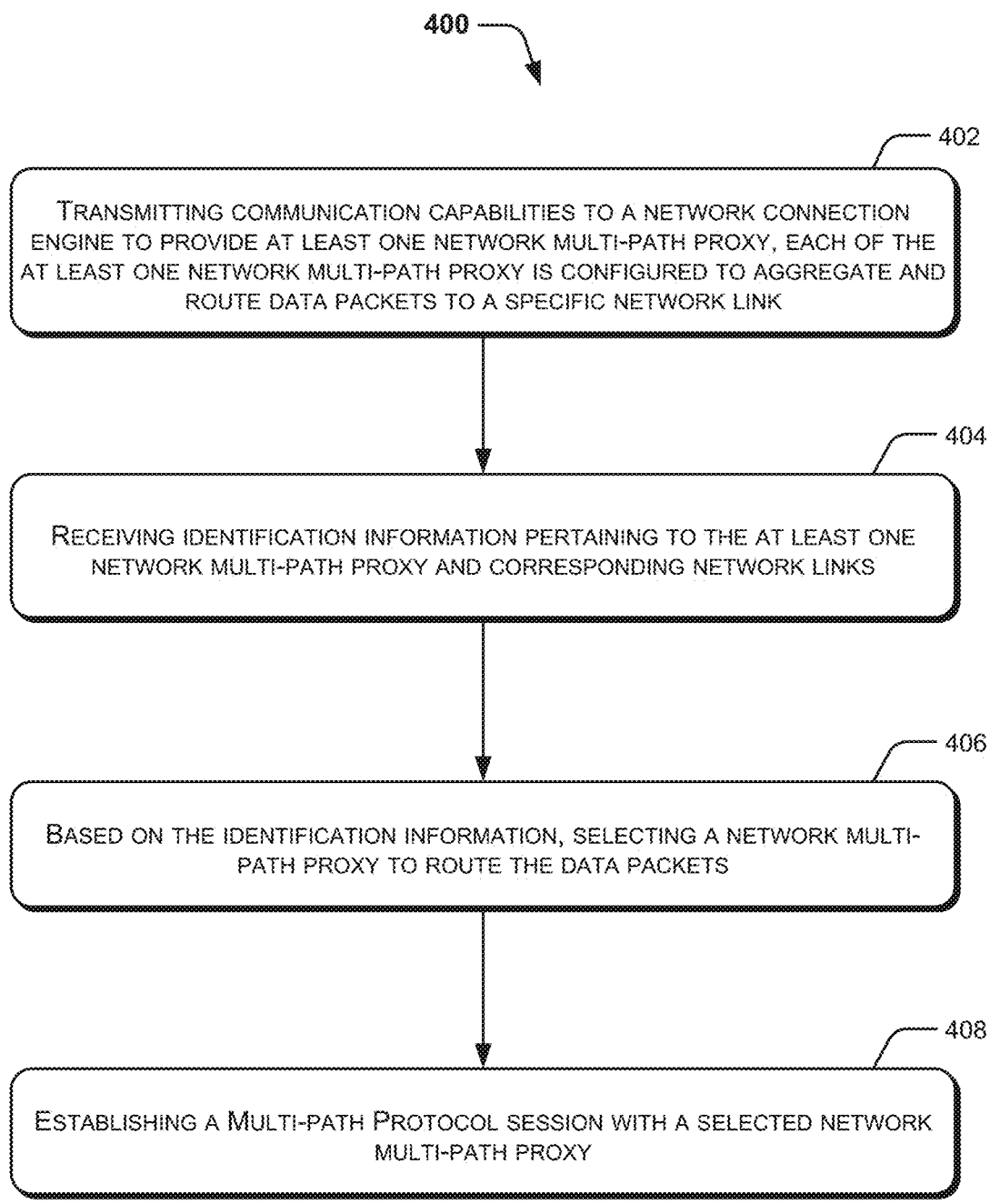
FIG. 4 illustrates a method for selecting a network multi-path proxy to route data packets from a multi-connectivity client device, according to an implementation of the present subject matter.
Figure 5:
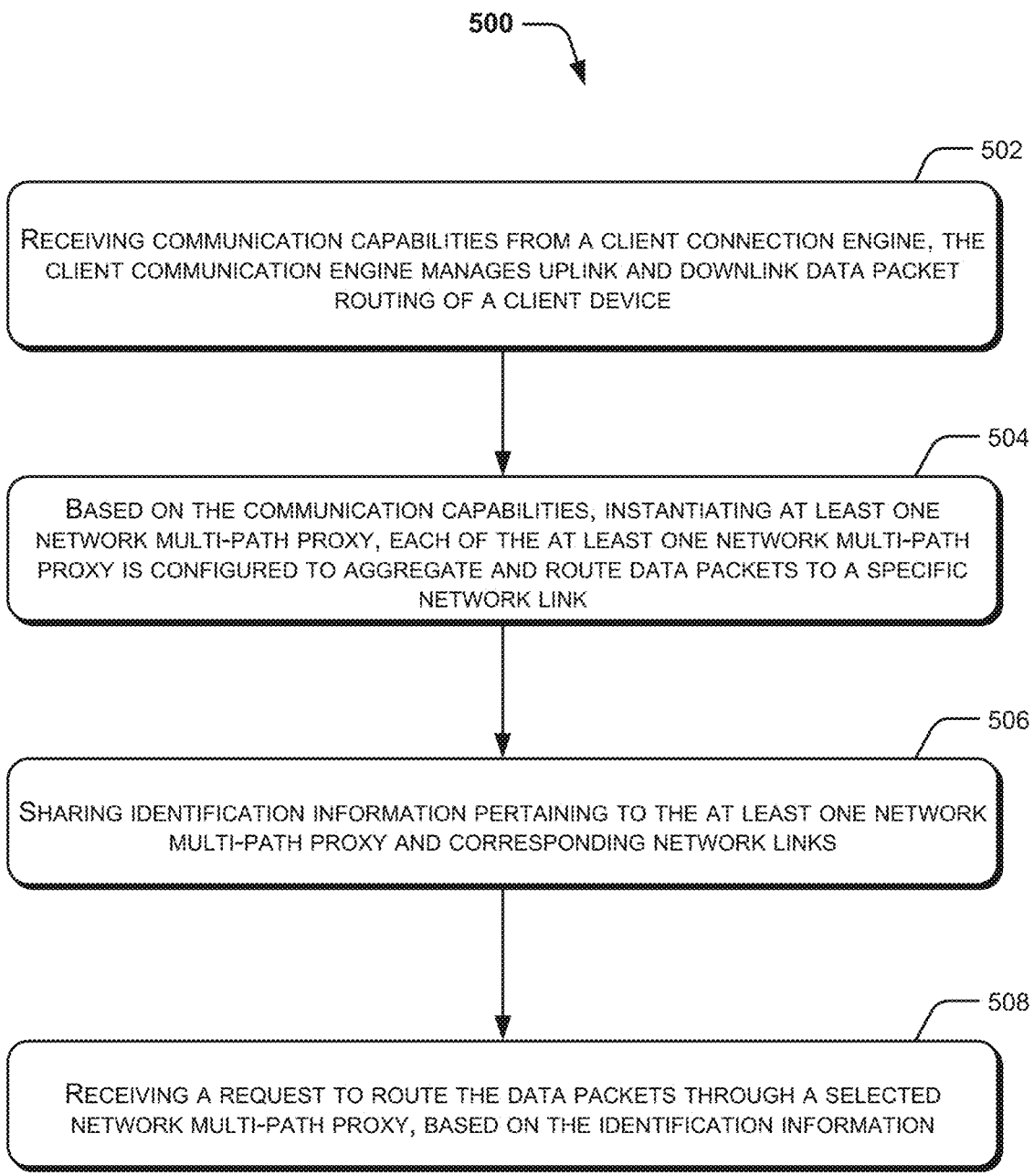
FIG. 5 illustrates a method for providing at least one network multi-path proxy by a network server to route data packets, according to an implementation of the present subject matter.

FIG. 4 and FIG. 5 illustrate methods 400 and 500 for selecting a network link to route the data packets. The order in which the methods 400 and 500 are described is not intended to be construed as a limitation, and any number of the described method blocks can be combined in any order to implement the methods 400 and 500, or an alternative method. Additionally, individual blocks may be deleted from the methods 400 and 500 without departing from the spirit and scope of the subject matter described herein. Furthermore, the methods 400 and 500 can be implemented in any suitable hardware, software, firmware, or combination thereof.

The methods 400 and 500 may be described in the general context of computer executable instructions. Generally, computer executable instructions can include routines, programs, objects, components, data structures, procedures, modules, functions, etc., that perform particular functions or implement particular abstract data types. The methods 400 and 500 may also be practiced in a distributed computing environment where functions are performed by remote processing devices that are linked through multiple communication networks.

A person skilled in the art will readily recognize that steps of the methods 400 and 500 can be performed by network entities, communicating in a communication environment. Herein, some implementations are also intended to cover program storage devices, for example, digital data storage media, which are machine or computer readable and encode machine-executable or computer-executable programs of instructions, wherein said instructions perform some or all of the steps of the described methods 400 and 500. The program storage devices may be, for example, digital memories, magnetic storage media, such as a magnetic disks and magnetic tapes, hard drives, or optically readable digital data storage media. The implementations are also intended to cover all the communication networks and communication devices configured to perform said steps of the methods 400 and 500.

In an implementation, the method 400 may be performed by client communication engine, such as the CCE 106 implemented within the MCCD 102. For the sake of brevity of description of FIG. 4, the different components performing the various steps of the method 400 are not described in detail. Such details are provided in the description provided with reference to FIGS. 1-3.

Referring to FIG. 4, at block 402 communication capabilities of the MCCD 102 may be transmitted. For example, the CCE 106 may transmit the communication capabilities to the NCE 110 residing at the network server 108 to provide at least one network multi-path proxy (NMPP). In an example, the NMPPs 116 may include a MPTCP proxy. Further, the NMPPs 116 may be configured to aggregate and route data packets to a specific network link. In an example, the specific network link may correspond to a specific core network 114. The communication capabilities, amongst other things, may include interface and multi-path protocols of the CCE 106. In an example implementation of the present subject matter, the communication capabilities may be transmitted by exchanging XML messages through a user plane data.

At block 404, identification information pertaining to the NMPPs 116 may be received. In an example, the CCE 106 may receive the identification information associated with the NMPPs 116. The identification information may also correspond to the network links associated with the NMPPs 116. The identification information, amongst other things, may include a port number and an Internet Protocol (IP) address of the NMPPs 116. In an implementation, the identification information may be received by the management module 214 of the MCCD 102.

At block 406, based on the identification information, a multi-path proxy may be selected to route the data packets. In an example, the CCE 106 may select one of the NMPPs 116 based on the identification information. Selection of one of the NMPPs 116 may indicate selection of the core network 114 associated with the NMPP 116 for routing the data packet. For example, if the CCE 106 selects the NMPP 116-1, it may also indicate selection of the Wi-Fi core network 114-1 corresponding to the NMPP 116-1 for accessing the target terminal 104.

Further, at block 408, a multi-path protocol may be established with the selected NMPP 116. For example, the CCE 106 may configure the CMPP 216 to establish the multi-path protocol, such as the MPTCP, with the selected NMPP 116. In an example, configuring the CMPP 216 may involve assigning specific NMPPs 116 to be used by the MCCD 102 based on a type of application.

Referring to FIG. 5, at block 502, the communication capabilities pertaining to the MCCD 102 may be received. In an example, the communication capabilities may be transmitted by the CCE 106 and received by the network server 108. In an example, the CCE 106 may manage uplink and downlink data packet routing of the MCCD 102. In an implementation, the communication capabilities may be received by using XML messages through a user plane data.

At block 504, based on the communication capabilities, at least one NMPP 116 may be instantiated. In an example, the NCE 110 may instantiate the NMPPs 116 based on the communication capabilities of the MCCD 102. Further, each of the NMPP 116 is configured to aggregate and route data packets to a specific network link. In an example, the specific network link may be associated with a specific core network 114. The network server 108 may instantiate the NMPPs 116 dynamically, upon receiving the communication capabilities, to aggregate and route data packets to the specific network link.

At block 506, the identification information pertaining to the NMPPs 116 and the corresponding network links may be shared. In an example, the network server 108 may share the identification information with the CCE 106. The identification information, amongst other things, may include a port number and an Internet Protocol (IP) address of the NMPPs 116. In an implementation, the NCE 110 may provide the identification information 222 pertaining to a preferred NMMP, to the CCE 106. For example, the NCE 110 may, based on current network conditions, provide the identification information 222 associated with the preferred NMMP, to the CCE 106.

At block 508, based on the identification information, a request may be received to route the data packets through the selected NMPP 116. In an example, the CCE 106 may configure the CMPP 216 to assign specific NMPPs 116 to be used by the MCCD 102 based on a type of application. Selection of one of the NMPPs 116 may indicate selection of the core network 114 associated with the NMPP 116 for routing the data packet. Based on the configuration of the CMPP 216, the network server 108 may receive the request from the CMPP 216 for routing the data packets through the specified NMPP 116. In an example, the request may be indicative of establishing a multi-path protocol, such as MPTCP, with the selected NMPP 116.

The above described methods 400 and 500 may allow the MCCD 102 to select the network link for routing the data packets, based on the communication capabilities of the MCCD 102 and the identification information of the NMPPs 116.

Although implementations of the present subject matter have been described in a language specific to structural features and/or methods, it is to be understood that the appended claims are not necessarily limited to the specific features or methods described. Rather, the specific features and methods are disclosed as examples of the present subject matter.

What is claimed is:

1. An apparatus, comprising:
   at least one processor; and
   at least one memory including computer program code;
   wherein the at least one memory and the computer program code are configured to, with the at least one processor, cause the apparatus to at least:
      send, by a client connection engine of a multi-connectivity client device toward a network connection engine, an indication of a set of capabilities of the multi-connectivity client device;
      receive, by the client connection engine from the network connection engine, identification information associated with a network multi-path proxy;
      receive, by the client connection engine from the network connection engine, a set of proxy parameters of the network multi-path proxy; and
      configure, by the client connection engine based on the identification information and the set of proxy parameters, a client multi-path proxy of the multi-connectivity client device for communication with the network multi-path proxy.

2. The apparatus of claim 1, wherein the set of capabilities of the multi-connectivity client device includes at least one of:
   an interface capability supported by the multi-connectivity client device;
   a multi-path protocol supported by the multi-connectivity client device;
   a flow aggregation and routing protocol supported by the multi-connectivity client device;
   a choice of a core network through which a target terminal is to be accessed; or
   a configuration mode indicative of a combination of an available access network and an available core network.

3. The apparatus of claim 1, wherein the identification information associated with the network multi-path proxy includes an indication of one or more network links associated with the network multi-path proxy.

4. The apparatus of claim 1, wherein the identification information associated with the network multi-path proxy includes at least one of:
   an address of the network multi-path proxy;
   a port number of the network multi-path proxy;
   an indication of a flow aggregation and routing protocol associated with the network multi-path proxy;
   an indication of a distribution policy associated with the network multi-path proxy; or an indication that the network multi-path proxy is a preferred network multi-path proxy for the multi-connectivity client device.

5. The apparatus of claim 1, wherein the set of proxy parameters includes at least one of:
    a mapping of access and core network paths to protocol specific header fields;
    an indication of one or more transport protocols supported;
    an indication of a security protocol, or
    one or more associated keys.

6. The apparatus of claim 1, wherein, to configure the client multi-path proxy of the multi-connectivity client device for communication with the network multi-path proxy, the at least one memory and the computer program code are configured to, with the at least one processor, cause the apparatus to at least:
    assign the network multi-path proxy to be used by the client multi-path proxy based on a type of application.

7. The apparatus of claim 1, wherein the at least one memory and the computer program code are configured to, with the at least one processor, cause the apparatus to at least:
    select, by the client connection engine from a set of available network multi-path proxies based on the identification information, the network multi-path proxy.

8. The apparatus of claim 7, wherein, to select the network multi-path proxy, the at least one memory and the computer program code are configured to, with the at least one processor, cause the apparatus to at least:
    provide an indication of a selection of a core network associated with the network multi-path proxy.

9. The apparatus of claim 1, wherein the at least one memory and the computer program code are configured to, with the at least one processor, cause the apparatus to at least:
    send, by the client multi-path proxy, a request to route a data packet through the network multi-path proxy.

10. The apparatus of claim 1, wherein the at least one memory and the computer program code are configured to, with the at least one processor, cause the apparatus to at least:
    receive, by the client connection engine from the network connection engine, an indication of a set of capabilities of the network multi-path proxy.

11. The apparatus of claim 10, wherein the indication of the set of capabilities of the network multi-path proxy includes at least one of:
    an indication of a flow aggregation and routing protocol supported by the network multi-path proxy; or
    a configuration mode indicative of a combination of an available access network and an available core network.

12. An apparatus, comprising:
    at least one processor; and
    at least one memory including computer program code;
    wherein the at least one memory and the computer program code are configured to, with the at least one processor, cause the apparatus to at least:
        receive, by a network connection engine from a client connection engine of a multi-connectivity client device, an indication of a set of capabilities of the multi-connectivity client device;
        instantiate, by the network connection engine based on the set of capabilities of the multi-connectivity client device, a network multi-path proxy; and
        send, by the network connection engine toward the client connection engine, identification information associated with the network multi-path proxy.

13. The apparatus of claim 12, wherein the set of capabilities of the multi-connectivity client device includes at least one of:
    an interface capability supported by the multi-connectivity client device;
    a multi-path protocol supported by the multi-connectivity client device;
    a flow aggregation and routing protocol supported by the multi-connectivity client device;
    a choice of a core network through which a target terminal is to be accessed; or
    a configuration mode indicative of a combination of an available access network and an available core network.

14. The apparatus of claim 12, wherein the identification information associated with the network multi-path proxy includes an indication of one or more network links associated with the network multi-path proxy.

15. The apparatus of claim 12, wherein the identification information associated with the network multi-path proxy includes at least one of:
    an address of the network multi-path proxy;
    a port number of the network multi-path proxy;
    an indication of a flow aggregation and routing protocol associated with the network multi-path proxy;
    an indication of a distribution policy associated with the network multi-path proxy; or
    an indication that the network multi-path proxy is a preferred network multi-path proxy for the multi-connectivity client device.

16. The apparatus of claim 12, wherein the at least one memory and the computer program code are configured to, with the at least one processor, cause the apparatus to at least:
    identify, by the network connection engine, an existing network multipath proxy; and
    configure, by the network connection engine based on the set of capabilities of the multi-connectivity client device, the existing network multipath proxy.

17. The apparatus of claim 12, wherein the at least one memory and the computer program code are configured to, with the at least one processor, cause the apparatus to at least:
    instantiate, by the network connection engine based on the set of capabilities of the multi-connectivity client device, multiple network multi-path proxies.

18. The apparatus of claim 12, wherein the at least one memory and the computer program code are configured to, with the at least one processor, cause the apparatus to at least:
    send, by the network connection engine toward the client connection engine, a set of proxy parameters of the network multi-path proxy.

19. The apparatus of claim 18, wherein the set of proxy parameters includes at least one of:
    a mapping of access and core network paths to protocol specific header fields;
    an indication of one or more transport protocols supported;
    an indication of a security protocol, or
    one or more associated keys.

20. The apparatus of claim 12, wherein the at least one memory and the computer program code are configured to, with the at least one processor, cause the apparatus to at least:

receive, by the network connection engine from the client connection engine, an indication of a selection of the network multi-path proxy by the client connection engine.

21. The apparatus of claim 12, wherein the at least one memory and the computer program code are configured to, with the at least one processor, cause the apparatus to at least:

receive, by the network multi-path proxy from a client multi-path proxy of the multi-connectivity client device, a request to route a data packet through the network multi-path proxy.

22. The apparatus of claim 21, wherein the request is indicative of establishing a multi-path connection with the selected network multi-path proxy.

23. The apparatus of claim 12, wherein the at least one memory and the computer program code are configured to, with the at least one processor, cause the apparatus to at least:

send, by the network connection engine toward the client connection engine, an indication of a set of capabilities of the network multi-path proxy.

24. The apparatus of claim 23, wherein the indication of the set of capabilities of the network multi-path proxy includes at least one of:

an indication of a flow aggregation and routing protocol; or a configuration mode indicative of a combination of an available access network and an available core network.

25. An apparatus, comprising:
at least one processor; and
at least one memory including computer program code;
wherein the at least one memory and the computer program code are configured to, with the at least one processor, cause the apparatus to at least:

receive, by a client multi-path proxy of a multi-connectivity client device from a client connection engine, configuration information for configuring the client multi-path proxy for communication with a network multi-path proxy, wherein the configuration information includes identification information associated with the network multi-path proxy and a set of proxy parameters of the network multi-path proxy; and support, by the client multi-path proxy based on the identification information associated with the network multi-path proxy and the set of proxy parameters of the network multi-path proxy, a connection with the network multi-path proxy.

26. An apparatus, comprising:
at least one processor; and
at least one memory including computer program code;
wherein the at least one memory and the computer program code are configured to, with the at least one processor, cause the apparatus to at least:

receive, by a network multi-path proxy from a network connection engine, configuration information for configuring the network multi-path proxy for communication with a client multi-path proxy of a multi-connectivity client device; and support, by the network multi-path proxy based on the configuration information, a connection with the client multi-path proxy of the multi-connectivity client device.

* * * * *